United States Patent
Cros

(10) Patent No.: US 8,074,924 B2
(45) Date of Patent: Dec. 13, 2011

(54) LOW-NOISE AIRCRAFT, PARTICULARLY AT TAKE-OFF AND LANDING

(75) Inventor: Christophe Cros, L'Union (FR)

(73) Assignee: Airbus Operations SAS, Toulouse (FR)

( * ) Notice: Subject to any disclaimer, the term of this patent is extended or adjusted under 35 U.S.C. 154(b) by 110 days.

(21) Appl. No.: 11/911,062

(22) PCT Filed: Apr. 11, 2006

(86) PCT No.: PCT/FR2006/000794
§ 371 (c)(1),
(2), (4) Date: Oct. 9, 2007

(87) PCT Pub. No.: WO2006/108957
PCT Pub. Date: Oct. 19, 2006

(65) Prior Publication Data
US 2008/0191087 A1    Aug. 14, 2008

(30) Foreign Application Priority Data

Apr. 13, 2005  (FR) ...................... 05 03666

(51) Int. Cl.
*B64D 27/00*    (2006.01)

(52) U.S. Cl. ............................ 244/55; 244/45 R; 244/13

(58) Field of Classification Search ............... 244/55, 244/56, 4 R, 12.1, 13, 34 R, 35 R, 45 R; D12/319, D12/340
See application file for complete search history.

(56) References Cited

U.S. PATENT DOCUMENTS

| 3,652,035 | A | * | 3/1972 | Fredericks | 244/12.1 |
| 3,869,102 | A | * | 3/1975 | Carroll | 244/36 |
| 3,936,017 | A |   | 2/1976 | Blythe et al. |  |
| 4,004,761 | A | * | 1/1977 | McAvoy | 244/100 A |
| 4,447,022 | A | * | 5/1984 | Lion | 244/13 |
| 4,674,712 | A |   | 6/1987 | Whitener et al. |  |
| 5,088,661 | A | * | 2/1992 | Whitener | 244/76 R |
| D495,988 | S | * | 9/2004 | Beaunis et al. | D12/319 |
| D530,658 | S | * | 10/2006 | Vigneron et al. | D12/319 |
| D566,031 | S | * | 4/2008 | Beaunis et al. | D12/319 |

FOREIGN PATENT DOCUMENTS

EP  0 273 466    7/1988
EP  1 041 000    10/2000

OTHER PUBLICATIONS http://www.merriam-webster.com/dictionary/fuselage.*
http://www.taiwanairpower.org/u2/images/u2c_config.jpg.*
The Encyclopedia of Modern Aircraft, Thunder Bay Press, p. 213.*
PCT International Search Report dated Sep. 20, 2006.
S. Steinke, "Aus der Trickkiste der Flugzeugentwickier Airbus-Konzepte für üebermorgen," XP009053625, Flug Revue, vol. Jan. 2001, pp. 22-25.

* cited by examiner

*Primary Examiner* — Joshua Michener
(74) *Attorney, Agent, or Firm* — Dickinson Wright PLLC

(57) ABSTRACT

An aircraft includes a rear vertical tail unit having two tail fins forming, with the rear part of a fuselage, a channel on the back of the fuselage. A turbine engine is arranged on the back of the fuselage so that gas streams generated by the turbine engine penetrate into the channel. The main landing gear of the aircraft is arranged integrally beneath the fuselage. The wings of the aircraft have a slight sweep angle and a large fineness ratio.

2 Claims, 1 Drawing Sheet

LOW-NOISE AIRCRAFT, PARTICULARLY AT TAKE-OFF AND LANDING

FIELD OF THE INVENTION

The present invention relates to an aircraft having a low noise level, particularly during take-off and landing.

BACKGROUND OF THE RELATED ART

For example, document U.S. Pat. No. 3,936,017 has already disclosed an aircraft comprising:
- a fuselage;
- two wings arranged laterally with respect to said fuselage and not carrying any engines;
- a rear vertical tail section consisting of at least two fins and forming, with the rear portion of said fuselage, a channel arranged on the back thereof; and
- at least one turbine engine arranged on the back of said fuselage such that the gas streams generated by said turbine engine enter said channel.

Thus, owing to the design of the rear tail sections in the form of a channel and to the arrangement of the turbine engines at the entrance to the channel, it is possible to achieve a considerable reduction in sound emissions since the noise generated by the turbine engines is sucked in by the channel and is evacuated along the latter and upwardly away from the fuselage, that is to say away from the passengers situated at the rear of the aircraft cabin, and a fortiori away from residents living near airports. The noise generated is thus masked by the rear tail sections of the fuselage, which constitute an acoustic shield.

SUMMARY OF THE INVENTION

The object of the present invention is to improve the aforementioned aircraft so as to reduce further still the noise generated by said turbine engines, primarily during takeoff and landing.

To this end, according to the invention, the aircraft of the type recalled above is noteworthy in that:
- the main landing gear of said aircraft is arranged entirely below the fuselage;
- said wings have a small sweep angle; and
- said wings have a high aspect ratio.

Thus, according to the invention, not only do the wings of said aircraft not carry any engines but, in addition, they do not have to support at least part of the landing gear. As a result, it becomes possible to optimize the aerodynamic characteristics of said wings:
- by reducing their sweep angle, thereby increasing the maximum lift of the aircraft, and thus the low-speed performance; and
- by increasing the aspect ratio of the wings (which is the ratio of the span of a wing to the square of the area of this wing), thereby providing them with a high fineness ratio.

Hence, the aircraft has excellent performance on takeoff (it rises more quickly) and on landing (it lands more slowly), with the result that the noise generated on takeoff and landing is also greatly reduced.

Preferably, said sweep angle is at most equal to 10° and said aspect ratio is at least equal to 10.

BRIEF DESCRIPTION OF THE DRAWINGS

The figures of the appended drawing will give a clear understanding of how the invention can be implemented. In these figures, identical references denote like elements.

DETAILED DESCRIPTION OF THE INVENTION

Figure 1:
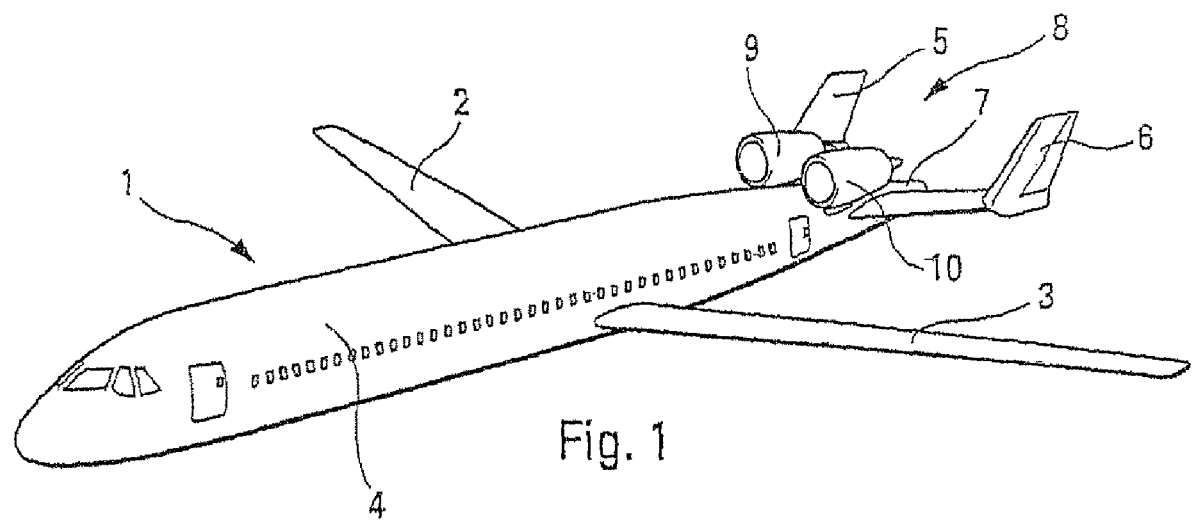
FIG. 1 is a perspective view, from the front and from above, of an aircraft according to the present invention.
Figure 2:
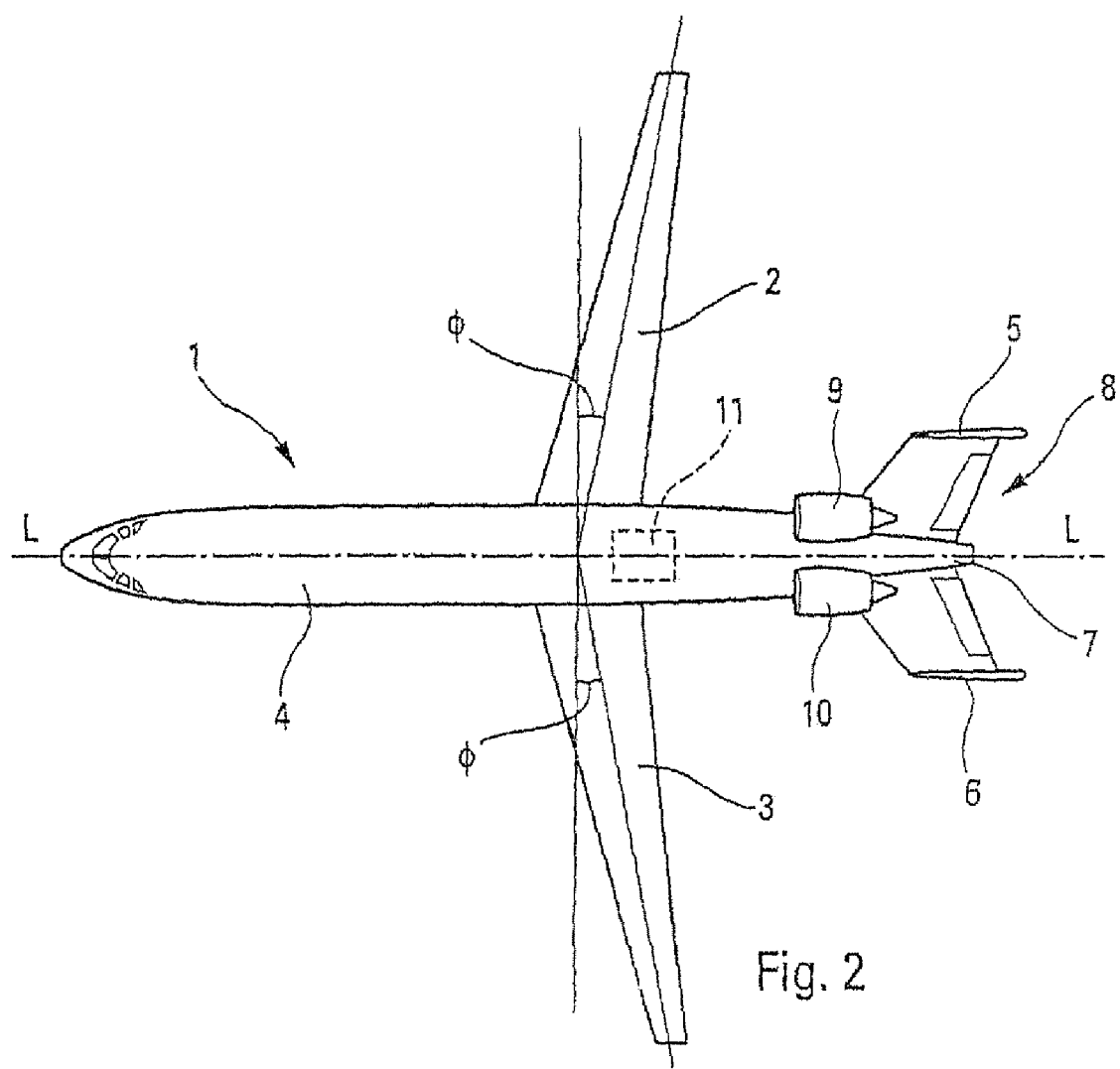
FIG. 2 is a plan view of the aircraft of FIG. 1.

The aircraft 1, shown schematically in FIGS. 1 and 2 and according to the present invention, comprises two wings 2 and 3 arranged, laterally and symmetrically, with respect to the fuselage 4, of longitudinal axis L-L.

The rear vertical tail section of the aircraft 1 comprises two fins 5 and 6 forming, with the rear portion 7 of the fuselage 4, a channel 8 arranged on the back of said aircraft. The channel 8 is open upwardly, but closed downwardly (by said rear portion 7) and laterally (by the fins 5 and 6).

Two turbine engines 9 and 10 are carried by the back of the fuselage 4 and are arranged such that the gas streams generated by said turbine engines enter said channel 8. Thus, this channel acts as an acoustic shield, thereby reducing the noise generated by the turbine engines 9 and 10, both downwardly and laterally.

The landing gear (not shown) of the aircraft 1 is arranged entirely below the fuselage 4 and, in the retracted state, it is housed in a compartment 11 formed in the lower portion of said fuselage.

Furthermore, the wings 2 and 3 have a small sweep angle $\phi$, for example at most equal to 10°, and a high aspect ratio (ratio of the span of a wing to the square of the area of this wing), for example at least equal to 10.

Thus, by virtue of the invention, the aircraft 1 is able to take off quickly and land slowly, thereby further reducing the noise perceived by persons situated in the vicinity of said aircraft when it is taking off and landing.

The invention claimed is:

1. A low noise commercial civil aircraft comprising:
   a fuselage;
   two swept-back wings arranged laterally with respect to said fuselage of said low noise commercial civil aircraft, the swept-back angle of said swept-back wings being at most equal to 10° and said swept-back wings having a light aspect ratio of 10 or greater, said swept-back wings carrying no engines and further carrying no landing gear;
   a rear vertical tail section comprising at least two fins and forming, with a rear portion of said aircraft, a channel arranged on the back thereof;
   a turbine unit comprising at least one turbine engine and arranged on a back of said fuselage and at least partially over said rear vertical tail section, such that gas streams generated by said at least one turbine engine enter said channel; and
   a main landing gear entirely arranged below said fuselage.

2. The low noise commercial civil aircraft of claim 1, wherein the at least two fins are located on distal ends of the rear tail section.

* * * * *